(12) United States Patent
Menezo et al.

(10) Patent No.: US 6,516,119 B2
(45) Date of Patent: Feb. 4, 2003

(54) DEVICE AND SYSTEM FOR WAVELENGTH MONITORING

(75) Inventors: Sylvie Menezo, Montrouge (FR); Franck Delorme, Brax (FR)

(73) Assignee: Alcatel, Paris (FR)

( * ) Notice: Subject to any disclaimer, the term of this patent is extended or adjusted under 35 U.S.C. 154(b) by 114 days.

(21) Appl. No.: 09/828,166

(22) Filed: Apr. 9, 2001

(65) Prior Publication Data

US 2002/0012119 A1 Jan. 31, 2002

(30) Foreign Application Priority Data

Apr. 10, 2000 (FR) ............................................. 00 04577

(51) Int. Cl.$^7$ ................................................. G02B 6/34
(52) U.S. Cl. .......................................... 385/37; 385/24
(58) Field of Search ............................... 385/24, 34, 46

(56) References Cited

U.S. PATENT DOCUMENTS 5,748,811 A * 5/1998 Amersfoort et al. ........... 385/15
5,793,907 A * 8/1998 Jalali et al. ................... 359/130
6,339,664 B1 * 1/2002 Farjady et al. ................. 385/24

FOREIGN PATENT DOCUMENTS

EP 0 703 679 A2 3/1996
JP 09 049 937 A 2/1997

OTHER PUBLICATIONS

Okamoto, K. et al.: "Fabrication of Multiwavelength Simultaneous Monitoring Device Using Arrayed–Waveguide Grating" Electronics Letter, GB, IEE Stevenage, vol. 32, No. 6, Mar. 14, 1996, pp. 569–570, XP000593641 ISSN: 0013–5194.

Shan Zhong et al.: "Integrated real time multi–channel wavelegnth monitoring circuit using phased–array waveguide grating" Optical Fiber Communication Conference and the International Conference on Integrated Optics and Optical Fiber Communications OFC/IOOC'99, pp. 30–32, vol. 3, XP002155883, 1999, NJ, USA.

* cited by examiner

Primary Examiner—Hung N. Ngo
(74) Attorney, Agent, or Firm—Sughrue Mion, PLLC

(57) ABSTRACT

The invention relates to a device for making a comparison between N nominal wavelength values ($\lambda ei$) and the wavelength values of optical signals coupled respectively to input ports (GEl) of a phasar whose structure comprises a grating (R) of guides (Gj). According to the invention, the phasar comprises two monitoring output ports (A,B) respectively placed about focal points corresponding to two interference orders of the grating (R) designed to collect the combination of the said signals, and its structure is designed so that the transmission function approximates to a triangular shape in order to widen the monitoring span. The invention applies notably to the wavelength 15 monitoring of a tuneable optical source.

6 Claims, 4 Drawing Sheets

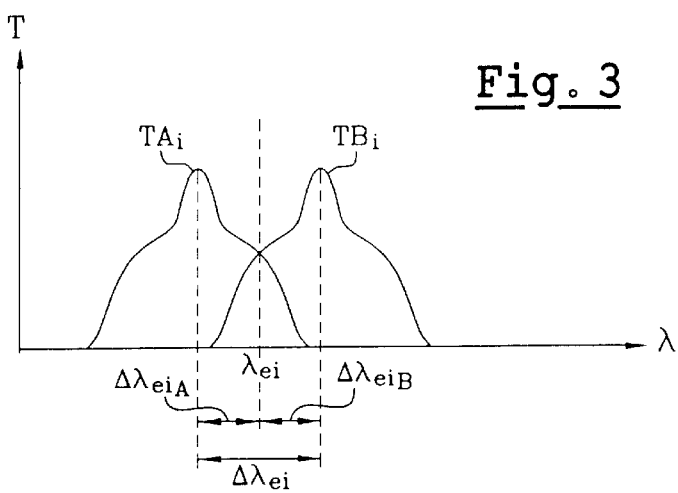
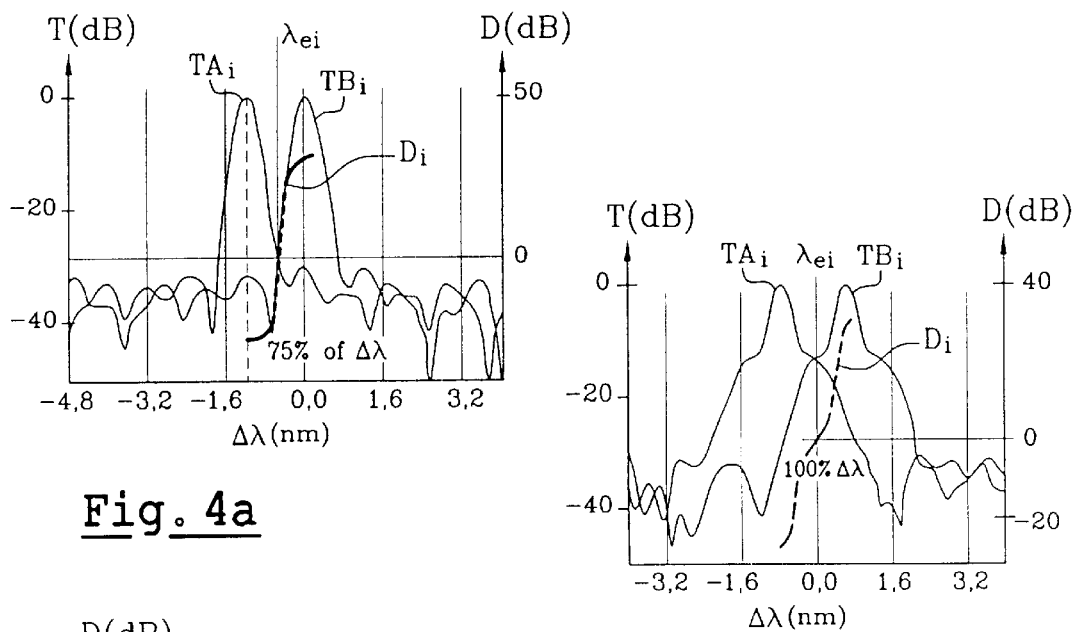
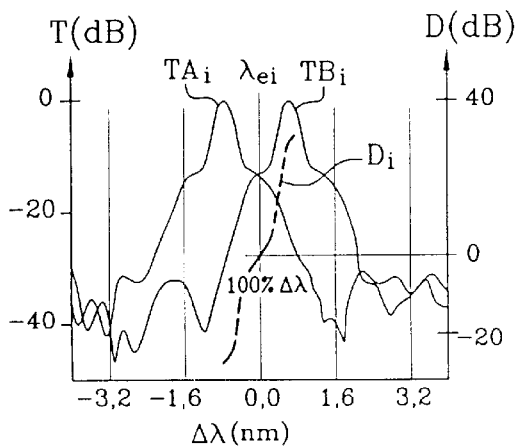
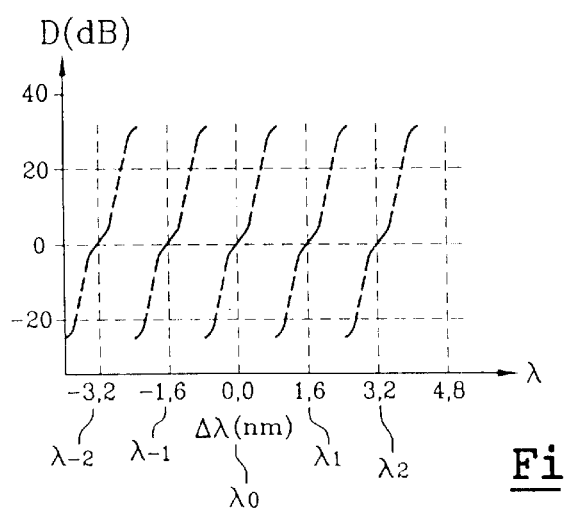

DEVICE AND SYSTEM FOR WAVELENGTH MONITORING

BACKGROUND OF THE INVENTION

The invention relates to a device for comparing an optical signal wavelength or wavelengths with at least one nominal wavelength, the said device including a phasar with a waveguide grating.

The invention also relates to a system for monitoring a tuneable optical source serving notably to generate the carrier waves signal.

The comparison is made with a view to the wavelength monitoring of the optical sources used for effecting wavelength multiplexing in telecommunications networks. The increase in the density requirements of the transmission channels of networks using wavelength multiplexing accentuates the importance of a rapid monitoring of the wavelengths of the optical sources and their stability; these wavelengths can undergo drift due to the aging of or temperature variations in optical sources.

Nominal wavelength means the emission wavelength imposed on the optical source. Nominal wavelengths correspond typically to values standardised by the International Telecommunications Union (ITU). It is possible to use lasers as optical sources. Input port (or output port) generally means an input guide (or output guide).

Drift correction consists of the wavelengths emitted by the optical sources designated as $\lambda i$ corresponding to the nominal wavelengths designated as $\lambda ei$.

Amongst the different types of known passive multiplexers, consideration will be given hereinafter to those which use an angular dispersion element such as an etched diffraction grating or a grating formed by waveguides, connecting two star shaped couplers. Hereinafter this type of multiplexer (referred to in English as "Phased-Arrayed Waveguide Grating Multiplexer" or "AWG") will be referred to as a phasar.

One example of a device for the wavelength monitoring of optical sources of a phasar is proposed in the article "Integrated real time multi-channel wavelength monitoring circuit using phased-arrayed waveguide grating" by S. Zhong et al., OFC'99, pp. 30–32. This article describes the implementation of wavelength monitoring for a phasar: the comb of N wavelengths to be monitored and multiplexed is duplicated. One comb is used for the wavelength monitoring, the other for the useful part to be multiplexed.

Another example of a device for the wavelength monitoring of the optical sources of a phasar is proposed in the article "A wavelength matching scheme for multiwavelength optical links and networks using grating demultiplexers" by F. Tong et al, IEEE Photonics Technology Letters, Vol 7. No 6, June 1995. In the solution proposed, two transmission channels are dedicated to the comparison of the wavelengths.

In the article "Fabrication of multiwavelength simultaneous monitoring device using arrayed-waveguide grating", Electronics Letters, Mar. 14, 1996, Vol. 32, No. 6, the authors K. Okamoto et al, describe a device making it necessary to take off some of the N input signals in order to reintroduce them into the phasar and to compare at the output the N corresponding signals detected on each side of the N principal output signals. In addition to a few losses caused by taking off some of the N input signals, this solution requires duplicating the input signals, an operation which is tedious to perform.

These devices also have black ranges for which wavelength monitoring cannot be achieved.

SUMMARY OF THE INVENTION

The purpose of the invention is to propose a solution which does not have the drawbacks mentioned above. It also makes it possible to widen the wavelengths monitoring ranges of the signals transmitted.

The invention applies to the monitoring of the wavelength of discreet lasers or tuneable lasers.

A detailed analysis of the functioning of the type of phasar envisaged in the invention and depicted in FIG. 1 shows that, for each wavelength value $\lambda i$ of the emission laser i, i varying from 1 to N, the optical wave constituting the input signal is coupled to an input guide GEi and undergoes the following operations:

diffraction in an input coupler CE, mathematically represented by the Fourier transform of the signal undergoing the diffraction, each guide Gj situated at the output surface SCE of the coupler receiving part of the diffracted wave, phase shifts in a grating R of M guides Gj with variable optical paths, j varying from 1 to M, situated between the coupler CE and a coupler CS, the optical path njLGj travelled in a guide Gj being expressed as a function of the refractive index nj of the guide Gj and its length LGj; the phase shifts producing, at the output of the grating R of guides, interferences which are constructive in a direction dependent on the wavelength, a focusing, on the output surface SCS of the coupler CS, of the constructive interferences of the waves issuing from the guides in the grating R.

The phasar according to the invention is designed so that at least two interference orders corresponding to two focal points form on the output surface SCS of the coupler CS for N given wavelengths, that is to say for the N wavelengths of the optical sources. The multiplexed signals resulting from the constructive interferences at these two orders are used for the wavelength monitoring.

More precisely, the object of the invention is a device for comparing an optical signal wavelength value or values with at least one nominal wavelength value $\lambda ei$, the said device including a phasar with a grating R of guides Gj, provided with N monitoring input ports GEi associated respectively with N nominal wavelength values $\lambda ei$, so that any optical signal having one of the said nominal wavelength values and being applied to the port associated with this nominal wavelength value focus at two focal points corresponding respectively to two interference orders of the grating R, the said phasar including two monitoring output ports A, B placed respectively about the said focal points, principally characterised in that the said phasar is designed so that the transmission function representing the variations in transmission between an input monitoring port and an output monitoring port as a function of the wavelength has a representative curve substantially triangular in shape about the nominal wavelength value associated with the said input port.

Concerning the practical embodiment design, an appropriate choice of the positions of the monitoring ports makes it possible to optimise the monitoring function. For this, use is made of the transmission functions TAi and TBi of the phasar defined respectively as the ratios of the optical powers present respectively at the outputs A and B to the optical power of the signal applied at the input port GEi, these power ratios being a function of the wavelength of the applied signal.

According to one embodiment characteristic of the invention, the optical paths njLGj of the guides Gj in the grating R of the phasar are adjusted so that the curve representing the said transmission function has a substantially triangular shape.

The positions of the output ports A and B are advantageously adjusted so that the difference between the two transmission functions TAi and TBi of the phasar for the output ports A and B, known as the discrimination function Di, is zero for the N nominal wavelength values $\lambda ei$ and bijective as a function of the wavelength around the nominal value of each wavelength. The bijective character means that, to each wavelength value taken around each of the nominal values, there corresponds a single value of the discrimination function Di and vice-versa.

Another object of the invention is a device as described above in which the phasar comprises a common input port GElaser and N demultiplexing output ports associated respectively with the said N nominal wavelengths and such that any optical signal applied to the said common port and having one of the said nominal wavelengths is focused on the demultiplexing port associated with this wavelength and in that the said demultiplexing output ports are coupled respectively to the said monitoring input ports associated respectively with the same nominal wavelengths.

To allow an electronic processing of the discrimination function Di, the two output ports A and B are coupled to photodetectors.

The invention also concerns a system for monitoring a tuneable optical source Li, principally characterised in that it includes a comparison device as described in the previous two paragraphs and control means CM for monitoring the wavelength of an optical source coupled to the said common input port GElaser as a function of the electrical signals supplied by the said photodetectors.

BRIEF DESCRIPTION OF THE DRAWINGS

Other particularities and advantages of the invention will emerge clearly from a reading of the description given by way of non-limitative example and with regard to the accompanying drawings, in which:

FIG. 3 depicts the curves of the transmission functions TAi, TBi according to the wavelength, FIG. 4a depicts on the one hand the curves of the transmission functions of the phasar for the guides A and B placed about two orders of the grating, and on the other hand the curve of the corresponding discrimination function Di as well as the spectral monitoring difference for a conventional grating of guides R, FIG. 4b depicts the same curves as FIG. 4a for a grating of guides whose optical paths have been adjusted, FIG. 4c depicts the curves of the discrimination functions for several wavelengths.

DETAILED DESCRIPTION OF THE INVENTION

Figure 1:
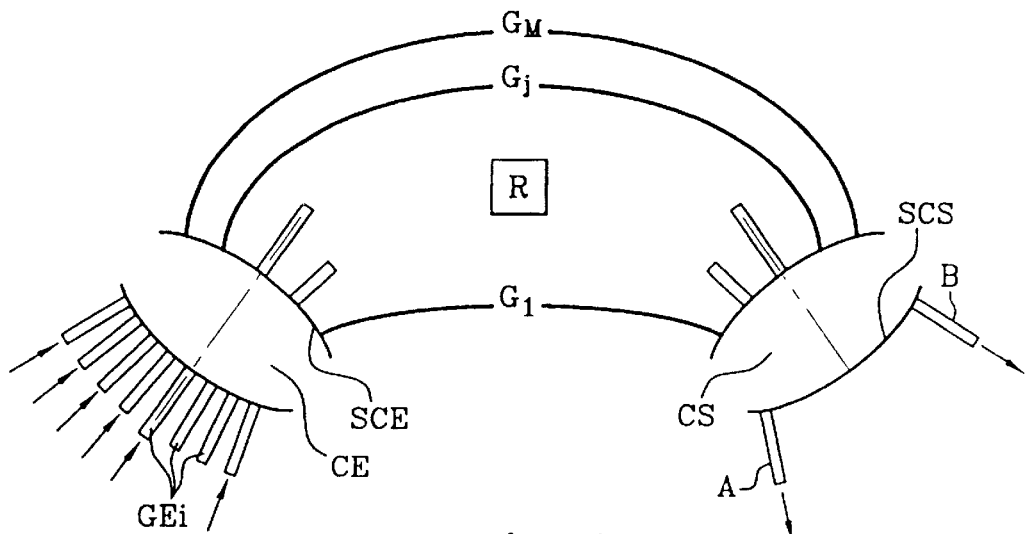
FIG. 1 depicts a schematic view of a phasar according to the invention.

FIG. 1 is a schematic view of a phasar. It consists of a first star coupler CE, whose input is connected to a plurality of input guides GEi constituting monitoring input ports. The output surface SCE of the coupler CE which is situated opposite the input guides GEi constitutes a surface for receiving the input optical waves coupled to the guides GEi, whose wavelength it is wished to monitor. The output surface SCE is connected to a grating R of M guides Gj. The other end of the grating R is connected to a star coupler CS. The output surface SCS of the coupler CS which is opposite the grating R constitutes a surface for receiving the optical waves issuing from the grating R and is connected to the guides A and B respectively placed about the focal points for two orders of the grating R.

Figure 2:
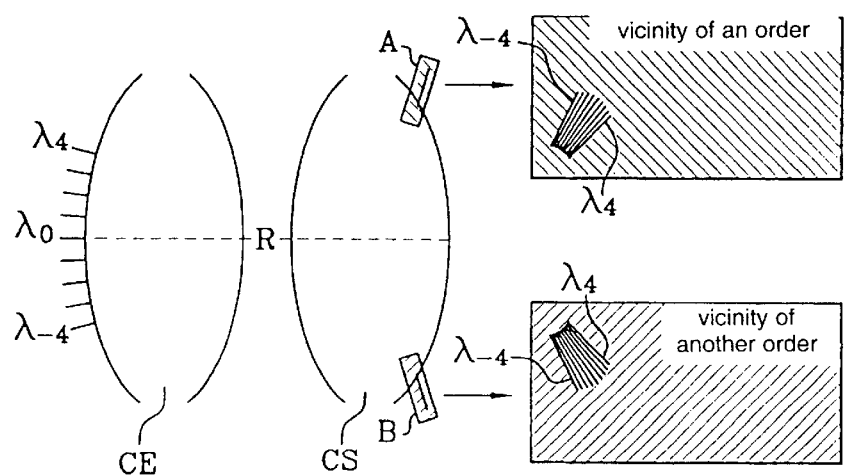
FIG. 2 shows in detail the focal points of the constructive interferences at the relevant orders of the grating.

The detail of the focal points of the constructive interferences at these orders is in FIG. 2. For each of these two orders, the location of the focal points varies according to the wavelength $\lambda i$ (for example $\lambda -4, \ldots, \lambda 0, \ldots, \lambda 4$) of the input signal. The focal point which is the most shifted geometrically with respect to the central position for the order in question corresponds to the most dispersed wavelength, an example of which is given in FIG. 2 under the reference $\lambda -4$.

According to the invention, two monitoring output guides A and B are added about the focal points for the two orders in question. A and B designate equally well either the output ports or the guides placed at these ports. A spectral shift denoted $\Delta \lambda ei$ corresponds to the geometric shift of each of the guides A and B. The spectral difference between the nominal wavelength value $\lambda ei$ and the wavelength value of the maximum of the transmission curve TAi at A is called $\Delta \lambda eiA$. Likewise for $\Delta \lambda eiB$. The guides A and B are placed so that $\Delta \lambda eiA = \Delta \lambda eiB$. Let $\Delta \lambda ei = \Delta \lambda eiA + \Delta \lambda eiB$.

The transmission function T of this phasar, between an input guide and an output guide, also referred to as the transfer function in the literature, is expressed according to the wavelength by a function of the Gaussian type.

FIG. 3 depicts the transmission functions TAi and TBi for A and B. The positioning of the guides A and B with respect to the focal points for the orders in question is adjusted so that, when the transmission functions TAi at A and TBi at B are analysed on the same device, the intersection point of the curves representing TAi and TBi coincides with a nominal wavelength value $\lambda ei$, for each wavelength value $\lambda ei$ of the optical sources.

When the wavelength emitted by the optical source at the input of a guide GEi is identical to the nominal wavelength value $\lambda ei$, the difference between the two functions TAi and TBi is cancelled out. This difference, referred to as the discrimination function Di, is expressed as a function of the wavelength and is shown in FIGS. 4a, 4b and 4c. When the transmission wavelength value is different from the nominal wavelength value $\lambda ei$, the discrimination function Di takes a non-zero value, positive if it is greater than the nominal wavelength value $\lambda ei$, negative if it is less. It is then possible to deduce the wavelength drift of the corresponding optical source with respect to the required nominal wavelength value.

Spectral monitoring span will be used to mean the wavelength range for which the discrimination function Di is bijective. When the discrimination function Di is no longer bijective, wavelength monitoring of the optical source can no longer be achieved. In FIG. 4a, that is to say in the case of a conventional phasar, it can be seen that the spectral monitoring span covers at a maximum only 75% of the spacing between two nominal wavelengths $\lambda ei$ and $\lambda e(i+1)$.

The device according to the invention makes it possible to obtain a continuous monitoring from one wavelength to another, that is to say covering 100% or even more of the space between two nominal wavelengths λei and λe(i+1), by widening this spectral monitoring span, as illustrated by FIGS. 4b and 4c. This widening is achieved advantageously by appropriately modulating the optical paths njLGj of the guides Gj so that the transfer functions TAi and TBi of the phasar at A and B approximate to a triangular function.

The optical path of the guide Gj of rank j of a conventional phasar is equal to $$n_1LG_1+(j-1) \Delta(nLG)$$

where $n_1LG_1$ is the optical path of the guide $G_1$ and $\Delta(nLG)$ is the constant path difference of the grating.

It is possible to modulate the optical paths njLGj by adding an optical path njLj; the invention was developed using the following equation:

$$njLj=(\lambda i/2\pi) * (\sin 2\pi ax / 2\pi ax)^2$$

with:

x=−1+2(j−11)/(M−1)

a=1.5

FIG. 4c depicts the curves of the discrimination functions Di around five wavelengths (λ−2, λ−1, λ0, λ1, λ2) evenly spaced apart. It will be noted that, for each of these discrimination functions Di, the spectral monitoring span does not exhibit any discontinuity with the following and/or previous spectral monitoring span: the black ranges are therefore totally eliminated.

Figure 5:
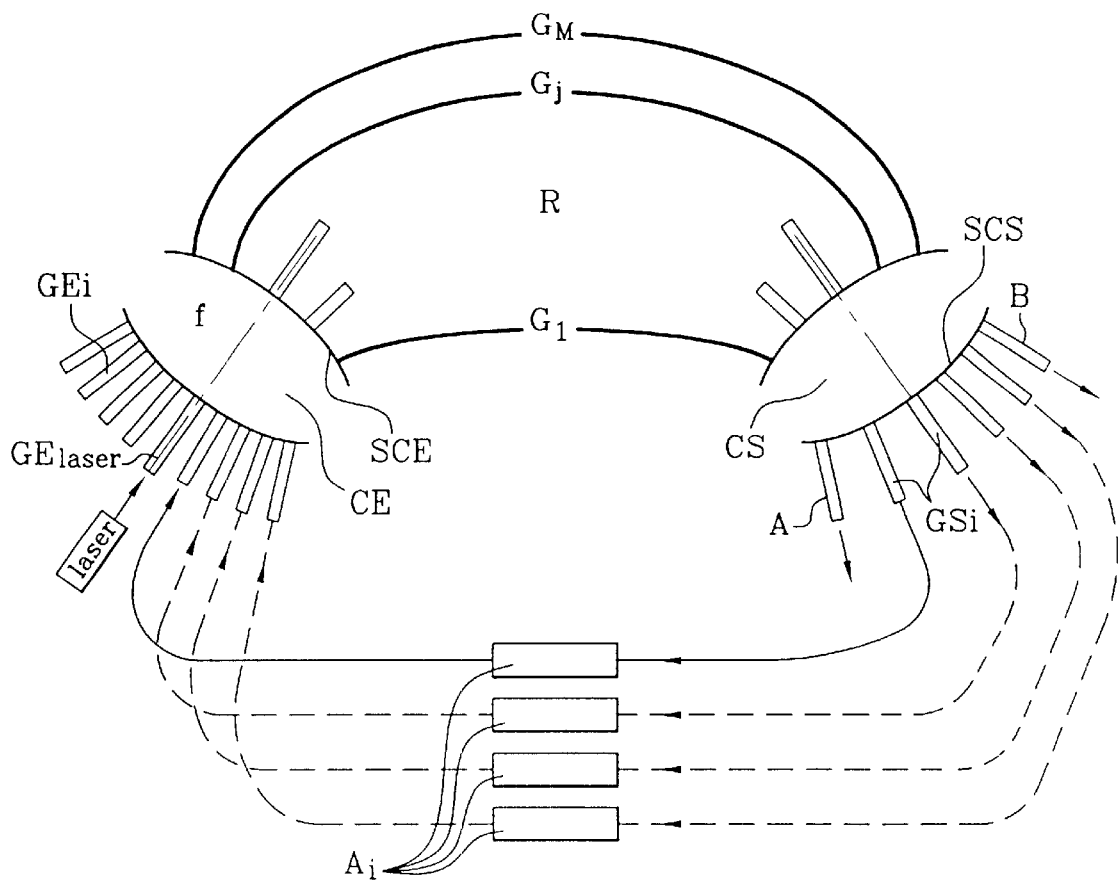
FIG. 5 depicts an application of the device according to the invention to a tuneable optical source.

The continuous monitoring which has just been described above applies in particular to a laser which is tuneable for wavelength, as will be described hereinafter and illustrated by FIGS. 5 and 6.

A tuneable laser emits a useful wave in one direction or a "lost" wave in the opposite direction. According to the invention, this lost part of the wave is used by the phasar for making the comparison between each wavelength which the laser can emit and the corresponding nominal wavelength value λei. Initially, the phasar functions as a demultiplexer, that is to say, to each nominal wavelength value λei which the laser can emit at a common input port GElaser depicted in FIG. 5, there corresponds an output port GSi which coincides with a focal point of the constructive interferences forming on the output surface SCS and which depends on the wavelength. Each output port GSi is coupled via an amplifier Ai to an input port GEi different from the input port of the laser GElaser.

Figure 6:
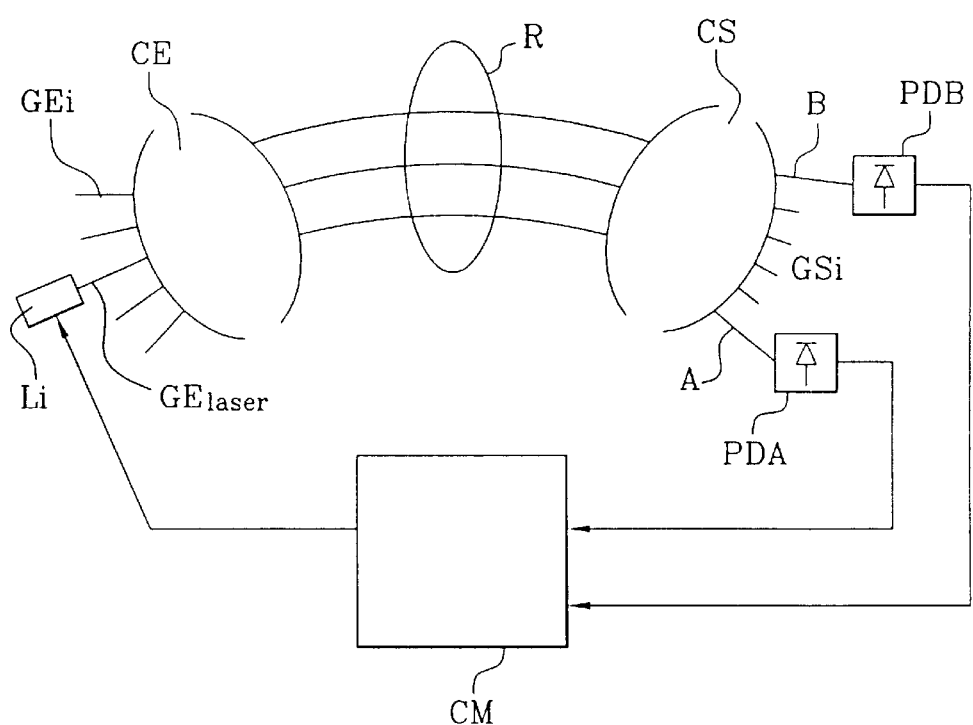
FIG. 6 depicts a system for monitoring a tuneable optical source according to the invention.

The tuneable optical source Li depicted in FIG. 6, coupled to the input port GElaser, is for example a tuneable laser with a distributed Bragg reflector.

Photodetectors PDA and PDB are coupled respectively to the output ports A and B. Electronic control means CM have inputs connected to the photodetectors PDA, PDB and an output for controlling the wavelengths of the source Li. This control acts for example on the temperature or supply current of the source to be monitored.

One way of making the monitoring consists in adjusting the monitoring parameter of the source so as to cancel out the function Di corresponding to one of the nominal wavelength values allocated to the source. These operations are performed after a prior calibration of the phasar by means of a reference source, whose wavelength is known in absolute terms (for example the C2H2 line).

The results indicated in the previous figures were obtained for a phasar whose parameters are set out in the following tables:

| Parameters of the waveguides | Value |
|---|---|
| Effective index of the guides GEi, GSi, A, B and Gj | 3.1993 |
| Interference order | 93 |
| Number M of guides Gj in the grating R | 60 |

Before the optical paths of the guides in the grating R are adjusted, the difference in length between two adjacent guides is $\Delta(LG)=44.8242$ μm.

The wavelength λ0 of the tuneable laser in question is 1542 nm.

What is claimed is:

1. A device for comparing an optical signal wavelength value or values with at least one nominal wavelength value (λei), the said device including a phasar with a grating (R) of guides (Gj), provided with N monitoring input ports (GEi) associated respectively with N nominal wavelength values (λei), so that any optical signal having one of the said nominal wavelength values and being applied to the port associated with this nominal wavelength value focus at two focal points corresponding respectively to two interference orders of the grating (R), the said phasar having two monitoring output ports (A, B) placed respectively about the said focal points, characterised in that the said phasar is designed so that the transmission function representing the variations in transmission between an input monitoring port and an output monitoring port as a function of the wavelength has a representative curve substantially triangular in shape about the nominal wavelength value associated with the said input port.

2. A device according to claim 1, characterised in that the optical paths (njLGj) of the guides (Gj) in the phasar grating (R) are adjusted so that the curve representing the said transmission function has a substantially triangular shape.

3. A device according to claim 1, characterised in that the positions of the output ports (A,B) are adjusted so that the difference between the two transmission functions of the phasar (TAi,TBi) for the output ports (A,B), known as the discrimination function (Di), is zero for all the nominal wavelength values (λei) and bijective as a function of the wavelength around the nominal value of each wavelength (λei).

4. A device according to claim 1, characterised in that the phasar comprises a common input port (GElaser) and N demultiplexing output ports associated respectively with the said N nominal wavelengths and such that any optical signal applied to the said common port and having one of the said nominal wavelengths is focused on the demultiplexing port associated with this wavelength and in that the said demultiplexing output ports are coupled respectively to the said monitoring input ports associated respectively with the same nominal wavelengths.

5. A device according to claim 1, characterised in :hat it includes photodetectors (PDA, PDB) coupled respectively to the two output ports (A,B).

6. A system for monitoring a tuneable optical source (Li), characterised in that it includes a comparison device according to claim 4 taken in combination and control means (CM) for monitoring the wavelength of an optical source coupled to the said common input port (GElaser) as a function of the electrical signals supplied by the said photodetectors.

* * * * *